UNITED STATES PATENT OFFICE.

JOSEPH DARBY, OF CORTLANDVILLE, NEW YORK, ASSIGNOR TO HIMSELF, STEPHEN BREWER, AND WILLIAM W. WINTER, OF SAME PLACE.

IMPROVED ROOFING CEMENT.

Specification forming part of Letters Patent No. 63,367, dated April 2, 1867.

*To all whom it may concern:*

Be it known that I, JOSEPH DARBY, of Cortlandville, in the county of Cortland and State of New York, have invented or discovered a new and useful water-proof cement or composition of matter for covering roofs to buildings, walks, and various other surfaces; and I do hereby declare that the following is a full and correct description thereof, and of the ingredients of which it is composed.

To form my cement, I use the following-named ingredients in about the following proportions—viz: one quart of ground plaster, one quart of water-lime, three quarts of sand or gravel, two quarts of coal-tar, two ounces of sulphur or brimstone.

Ordinarily I first mix the sulphur thoroughly with the tar, and usually bring the latter to about the boiling-point. I then mix therewith the other ingredients.

The effect of the sulphur upon the tar is to make it very tough and elastic, and consequently imparts the same qualities to the cement—an effect highly important and desirable. I sometimes, however, mix the sulphur with the mineral ingredients first, and then mix them all with the tar. When thus mixed and prepared I spread my cement, usually warm, upon the roof, walk, or other surface with a trowel, hoe, stiff broom, or any other instrument that may be found convenient.

What I claim as my invention, and desire to secure by Letters Patent, is as follows:

As a cement for roofs, walks, and other surfaces, the herein-described composition of matter.

Dated December 12, 1866.

JOSEPH DARBY.

Witnesses:
  N. H. HAYNES,
  JOHN T. PRATT.